United States Patent
Matsumura et al.

(10) Patent No.: US 11,181,881 B2
(45) Date of Patent: Nov. 23, 2021

(54) MOTOR CONTROL SYSTEM, CONTROL METHOD, AND MOTOR CONTROL APPARATUS

(71) Applicant: KABUSHIKI KAISHA YASKAWA DENKI, Kitakyushu (JP)

(72) Inventors: Isamu Matsumura, Kitakyushu (JP); Yusuke Tanaka, Kitakyushu (JP); Tomofumi Nishiyama, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 0 days.

(21) Appl. No.: 16/587,061

(22) Filed: Sep. 30, 2019

(65) Prior Publication Data

US 2020/0089187 A1    Mar. 19, 2020

Related U.S. Application Data

(63) Continuation of application No. PCT/JP2017/013359, filed on Mar. 30, 2017.

(51) Int. Cl.
G05B 19/21    (2006.01)

(52) U.S. Cl.
CPC ...... *G05B 19/21* (2013.01); *G05B 2219/2214* (2013.01)

(58) Field of Classification Search
CPC ................ G05B 19/21; G05B 2219/2214
See application file for complete search history.

(56) References Cited

U.S. PATENT DOCUMENTS

| | | | |
|---|---|---|---|
| 10,121,365 B2 | 11/2018 | Ogawa | |
| 2011/0169441 A1* | 7/2011 | Yoshiura | G05B 19/4141 318/625 |
| 2015/0303841 A1* | 10/2015 | Suzuki | H02P 25/06 318/38 |

FOREIGN PATENT DOCUMENTS

| | | |
|---|---|---|
| EP | 1460503 A1 | 9/2004 |
| EP | 3211494 A2 | 8/2017 |
| JP | 08-241111 | 9/1996 |
| JP | 10-105206 | 4/1998 |
| JP | 2007-181340 | 7/2007 |
| JP | 2008-090825 | 4/2008 |
| WO | WO 2016/042636 | 3/2016 |

OTHER PUBLICATIONS

International Search Report for corresponding International Application No. PCT/JP2017/013359, dated Jun. 27, 2017.
Extended European Search Report for corresponding EP Application No. 17904022.5-1202, dated Oct. 28, 2020.

* cited by examiner

*Primary Examiner* — Kawing Chan
*Assistant Examiner* — Bradley R Brown
(74) *Attorney, Agent, or Firm* — Mori & Ward, LLP (57) ABSTRACT

A motor control system includes motor control apparatuses and position detectors. Each of the motor control apparatuses is configured to control at least one of the motors. The position detectors each of which corresponds to each of the motors and each of which is configured to detect position information of each of the motors. All of the plurality of position detectors are connected in series under a control of a first motor control apparatus among the motor control apparatuses. The first motor control apparatus is configured to transfer the position information of the motors read out from the position detectors to other motor control apparatuses among the motor control apparatuses.

7 Claims, 7 Drawing Sheets

MAPPING TABLE #2

| | COMMUNICATION ADDRESS |
|---|---|
| MOTOR CONTROL UNIT #4 (FOURTH AXIS) ENCODER LOGICAL-AXIS I/F | #4 (ENCODER #4) |
| MOTOR CONTROL UNIT #4 (FOURTH AXIS) SENSOR LOGICAL-AXIS I/F | NONE |
| MOTOR CONTROL UNIT #5 (FIFTH AXIS) ENCODER LOGICAL-AXIS I/F | #5 (ENCODER #5) |
| MOTOR CONTROL UNIT #5 (FIFTH AXIS) SENSOR LOGICAL-AXIS I/F | NONE |
| MOTOR CONTROL UNIT #6 (SIXTH AXIS) ENCODER LOGICAL-AXIS I/F | #6 (ENCODER #6) |
| MOTOR CONTROL UNIT #6 (SIXTH AXIS) SENSOR LOGICAL-AXIS I/F | NONE |

FIG. 3B

MAPPING TABLE #1

| | COMMUNICATION ADDRESS |
|---|---|
| MOTOR CONTROL UNIT #1 (FIRST AXIS) ENCODER LOGICAL-AXIS I/F | #1 (ENCODER #1) |
| MOTOR CONTROL UNIT #1 (FIRST AXIS) SENSOR LOGICAL-AXIS I/F | #9 (SENSOR #9) |
| MOTOR CONTROL UNIT #2 (SECOND AXIS) ENCODER LOGICAL-AXIS I/F | #2 (ENCODER #2) |
| MOTOR CONTROL UNIT #2 (SECOND AXIS) SENSOR LOGICAL-AXIS I/F | #8 (SENSOR #8) |
| MOTOR CONTROL UNIT #3 (THIRD AXIS) ENCODER LOGICAL-AXIS I/F | #3 (ENCODER #3) |
| MOTOR CONTROL UNIT #3 (THIRD AXIS) SENSOR LOGICAL-AXIS I/F | #7 (SENSOR #7) |

MOTOR CONTROL SYSTEM, CONTROL METHOD, AND MOTOR CONTROL APPARATUS

TECHNICAL FIELD

The present disclosure relates to a motor control system, a control method, and a motor control apparatus.

BACKGROUND ART

Patent Literature 1 discloses a system in which a plurality of sensors are connected to an interface unit through respective communication paths, and a detection signal of each of the sensors is transmitted to a host controller or a motor control apparatus via a network that connects the host controller and the motor control apparatus to each other.

Patent Literature 2 discloses a system in which a peripheral device that sets a parameter of a motor control apparatus or performs monitoring of the motor control apparatus through a communication unit in the motor control apparatus is connected.

CITATION LIST

Patent Literature

Patent Literature 1: JP H8-241111 A
Patent Literature 2: JP H10-105206 A

SUMMARY OF INVENTION

Technical Problem

However, there is a problem in that each sensor or each peripheral device is connected to a motor control apparatus, and thus a physical or processing cost tends to increase, in the system in the related art.

The present disclosure has been made in consideration of the above circumstances, and an object of the present disclosure is to provide a motor control system, a control method, and a motor control apparatus, in which it is possible to reduce a physical or processing cost.

Solution to Problem

According to the first aspect of the present disclosure, a motor control system includes a plurality of motor control apparatuses and a plurality of position detectors. Each of the plurality of motor control apparatuses is configured to control at least one of the plurality of motors. Each of the plurality of position detectors corresponds to each of the plurality of motors and is configured to detect position information of each of the plurality of motors. All of the plurality of position detectors are connected in series under a control of a first motor control apparatus among the plurality of motor control apparatuses. The first motor control apparatus is configured to transfer the position information of the plurality of motors read out from the plurality of position detectors to other motor control apparatuses among the plurality of motor control apparatuses.

The second aspect of the present disclosure is summarized as a control method in a motor control system configured to control a plurality of motors, the method including: controlling at least one of the plurality of motors by each of a plurality of motor control apparatuses; detecting position information of one of the plurality of motors, which corresponding to each of a plurality of position detectors by each of the plurality of position detectors; and transferring position information of the plurality of motors to other motor control apparatuses in the plurality of motor control apparatuses by a first motor control apparatus in the plurality of motor control apparatuses, the position information being read out from all of the plurality of position detectors, and all of the plurality of position detectors being connected in series under a control of the first motor control apparatus.

The third aspect of the present disclosure is summarized as a motor control apparatus used in a motor control system configured to control a plurality of motors, wherein the motor control apparatus is configured to control at least one of the plurality of motors, a plurality of position detectors configured to detect position information of one motor corresponding to each of the position detectors among the plurality of motors are connected in series under a control of the motor control apparatus, and the motor control apparatus is configured to transfer position information of the plurality of motors to other motor control apparatuses, the position information being read out from the plurality of position detectors.

Advantageous Effects of Invention

According to the present disclosure, it is possible to provide a motor control system, a control method, and a motor control apparatus, in which it is possible to reduce a physical or processing cost.

DESCRIPTION OF EMBODIMENTS

According to the viewpoint of the inventor of the present invention, sensing of an operation situation in a motor control system has become more important in recent years. However, if the number of sensors increases, a physical cost for the number of wires and the like and a processing cost for traffic, processing loads, and the like increase. In particular, in a case where sensing is performed in real time, the costs tend to increase.

As a result of intensive research and development to reduce the costs in the motor control system, the inventor of the present invention has conceived of a new and unique motor control system. Hereinafter, an example of a motor control system 1 according to an embodiment will be described with reference to FIGS. 1 to 7.

Figure 1:
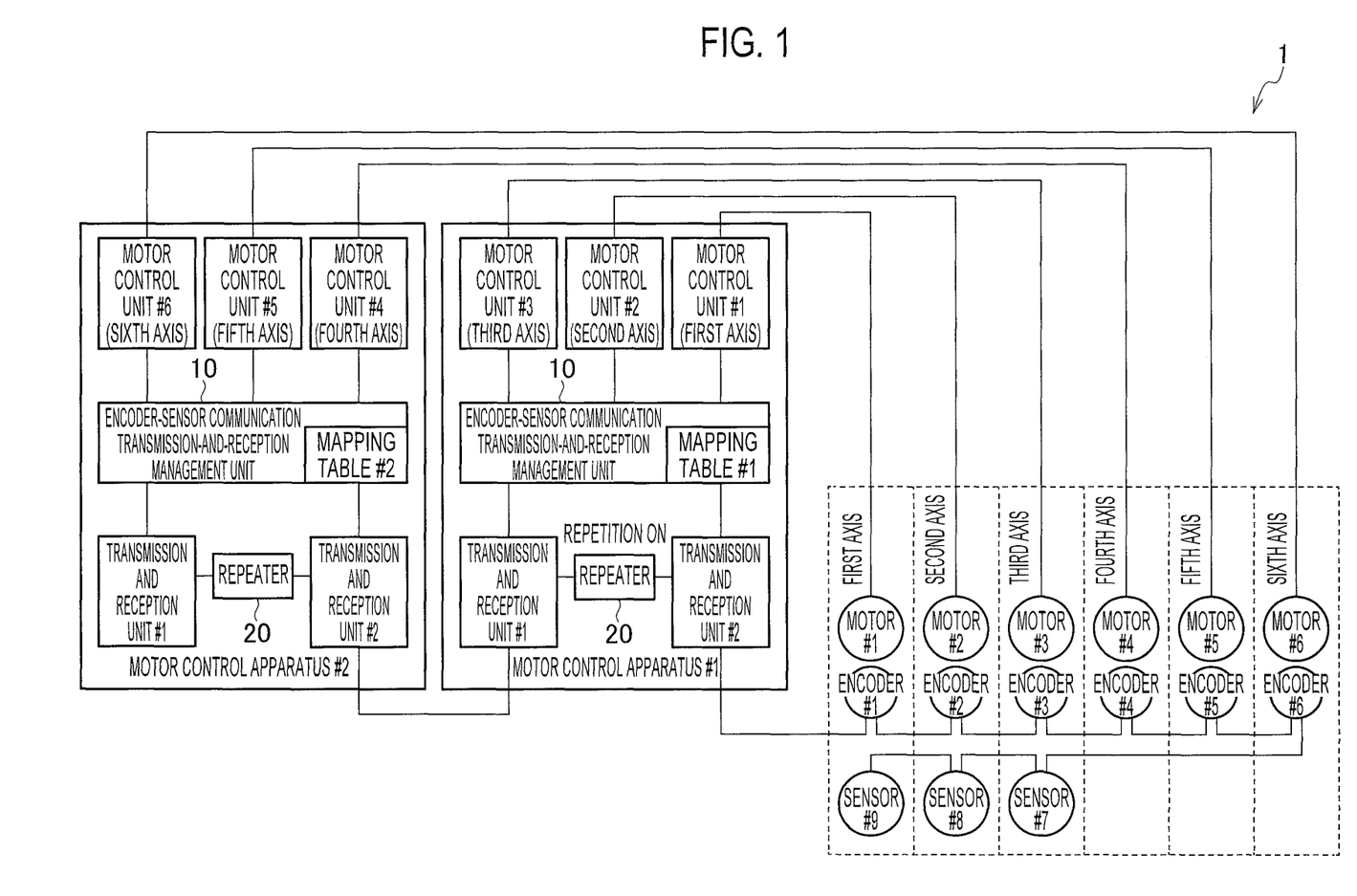
FIG. 1 is a schematic diagram illustrating an example of an overall configuration of a motor control system according to an embodiment.

In the present disclosure, the motor control system 1 according to the embodiment is configured to control a plurality of motors #1 to #6. As illustrated in FIG. 1, the motor control system 1 includes motor control apparatuses #1 and #2, motors #1 to #6, a mechanical apparatus (not illustrated), encoders #1 to #6, and sensors #7 to #9.

Each of the motor control apparatuses #1 and #2 is configured to control at least one of the plurality of motors #1 to #6.

In the embodiment, as an example, a case where the motor control apparatus #1 is configured to control the motors #1 to #3, and the motor control apparatus #2 is configured to control the motors #4 to #6 is described. The present disclosure is not limited to the case. For example, the present disclosure can be applied to a case where the motor control apparatus #1 controls the motors #1 to #6.

In the embodiment, a case where the two motor control apparatuses #1 and #2 are provided is described as an example. The present disclosure can be applied to a case where three motor control apparatuses or more are provided.

Specifically, the motor control apparatuses #1 and #2 are devices including computers that control amplifier units that output a current, a voltage, and the like to the motors #1 to #3 and the motors #4 to #6, respectively. That is, the motors #1 to #3 and the motors #4 to #6 are configured to rotate in accordance with the voltage or the current applied from the motor control apparatuses #1 and #2, respectively.

Generally, the motor control apparatuses #1 and #2 that control a servomotor are called as servo-controllers, servo-amplifiers, or the like. The motor control apparatuses #1 and #2 may be devices configured to control motors, for example, may be inverters.

Specifically, as illustrated in FIG. 1, the motor control apparatus #1 includes an amplifier unit (not illustrated), motor control units #1 to #3 that respectively control the motors #1 to #3, an encoder-sensor communication transmission-and-reception management unit 10, transmission and reception units #1 and #2, and a repeater 20.

Similarly, the motor control apparatus #2 includes an amplifier unit (not illustrated), motor control units #4 to #6 that respectively control the motors #4 to #6, an encoder-sensor communication transmission-and-reception management unit 10, transmission and reception units #1 and #2, and a repeater 20.

The amplifier unit is a power converter configured to supply a current or a voltage based on a torque command from the motor control units #1 to #6, to the motors #1 to #6.

Figure 2:
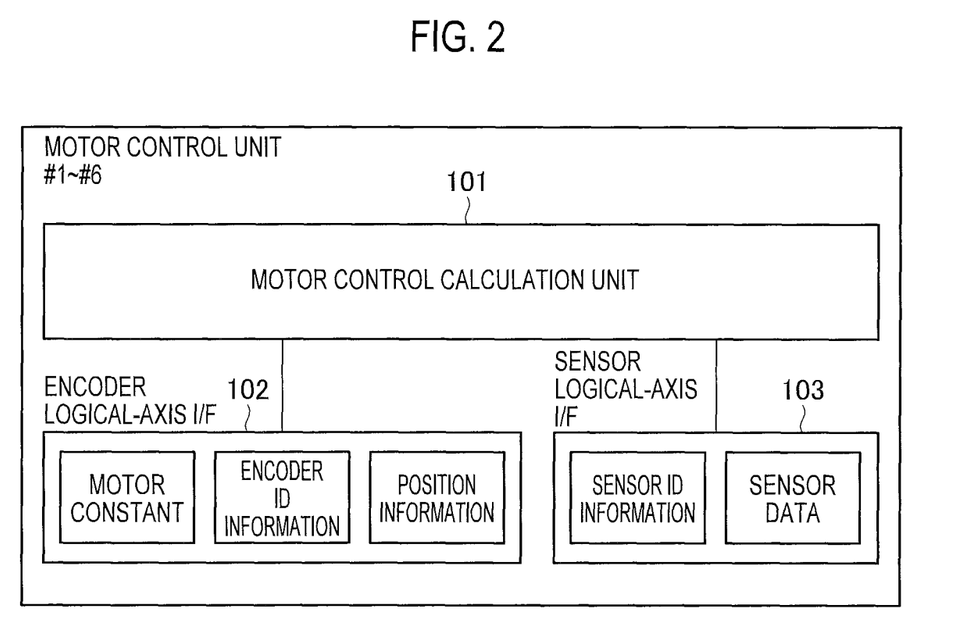
FIG. 2 is a diagram illustrating an example of a function block of a motor control unit in each of motor control apparatuses constituting a motor control system according to the embodiment.

Here, as illustrated in FIG. 2, each of the motor control apparatuses #1 and #2 includes a motor control calculation unit 101, an encoder logical-axis interface 102, and a sensor logical-axis interface 103.

The motor control calculation unit 101 is configured to receive a command (position command and the like) from a host device and performs calculation for controlling positions, speeds, torques, and the like of the motors #1 to #6.

The encoder logical-axis interface 102 is configured to read out at least one of constants of the motors #1 to #6 corresponding to the motor control units #1 to #6 to which the encoder logical-axis interface 102 belongs, and identification information (encoder ID information) of the encoders #1 to #6 corresponding to the motors #1 to #6, based on mapping tables #1 and #2 managed by the encoder-sensor communication transmission-and-reception management units 10 in a constant reading procedure.

The encoder logical-axis interface 102 is configured to acquire position information of the motors #1 to #6 corresponding to the motor control units #1 to #6 to which the encoder logical-axis interface 102 belongs, based on the mapping tables #1 and #2 managed by the encoder-sensor communication transmission-and-reception management units 10 in a position-information reading procedure.

Specifically, in the embodiment, the encoder logical-axis interface 102 in the motor control unit #1 is configured to acquire the motor constant or the position information of the motor #1 and the encoder ID information of the encoder #1 from the encoder-sensor communication transmission-and-reception management unit 10.

Similarly, the encoder logical-axis interface 102 in the motor control unit #2 is configured to acquire the motor constant or the position information of the motor #2 and the encoder ID information of the encoder #2 from the encoder-sensor communication transmission-and-reception management unit 10.

Similarly, the encoder logical-axis interface 102 in the motor control unit #3 is configured to acquire the motor constant or the position information of the motor #3 and the encoder ID information of the encoder #3 from the encoder-sensor communication transmission-and-reception management unit 10.

Similarly, the encoder logical-axis interface 102 in the motor control unit #4 is configured to acquire the motor constant or the position information of the motor #4 and the encoder ID information of the encoder #4 from the encoder-sensor communication transmission-and-reception management unit 10.

Similarly, the encoder logical-axis interface 102 in the motor control unit #5 is configured to acquire the motor constant or the position information of the motor #5 and the encoder ID information of the encoder #5 from the encoder-sensor communication transmission-and-reception management unit 10.

Similarly, the encoder logical-axis interface 102 in the motor control unit #6 is configured to acquire the motor constant or the position information of the motor #6 and the encoder ID information of the encoder #6 from the encoder-sensor communication transmission-and-reception management unit 10.

The sensor logical-axis interface 103 is configured to read out identification information (sensor ID information) of the sensors #7 to #9 corresponding to the motors #1 to #6 corresponding to the motor control units #1 to #6 to which the sensor logical-axis interface 103 belongs, based on the mapping tables #1 and #2 managed by the encoder-sensor communication transmission-and-reception management units 10 in the constant reading procedure.

The sensor logical-axis interface 103 is configured to read out sensor data of the sensors #7 to #9 corresponding to the motors #1 to #6 corresponding to the motor control units #1 to #6 to which the sensor logical-axis interface 103 belongs, based on the mapping tables #1 and #2 managed by the encoder-sensor communication transmission-and-reception management units 10 in the position-information reading procedure. Here, the sensor data includes ON/OFF information and the like of the sensor, for example.

The encoder-sensor communication transmission-and-reception management unit 10 is configured to manage communications with the motors #1 to #6 or the sensors #7 to #9. Here, the encoder-sensor communication transmission-andreception management unit 10 is configured to manage the mapping tables illustrated in FIGS. 3A and 3B.

Figure 3A:
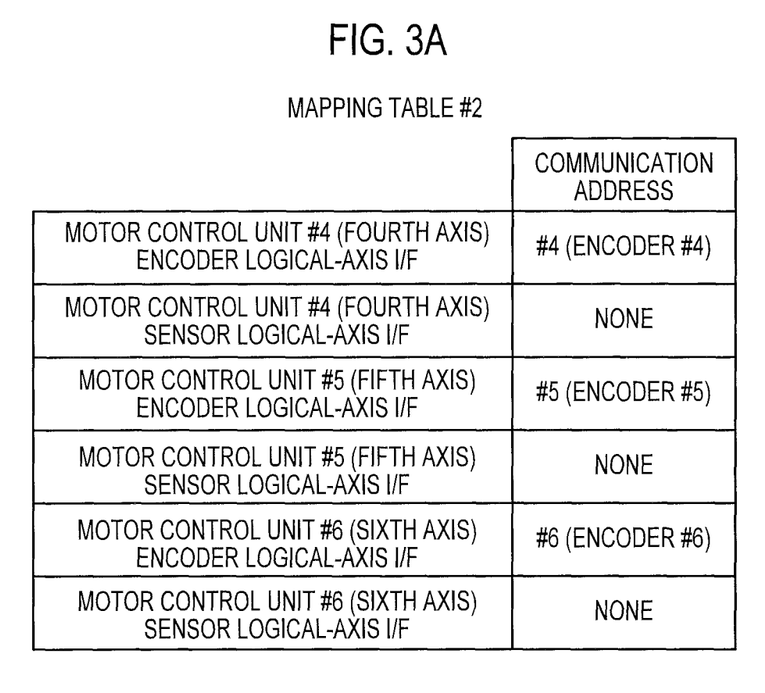
FIGS. 3A and 3B are diagrams illustrating examples of mapping tables managed by an encoder-sensor communication transmission-and-reception management unit of each of the motor control apparatuses constituting the motor control system according to the embodiment.
Figure 3B:
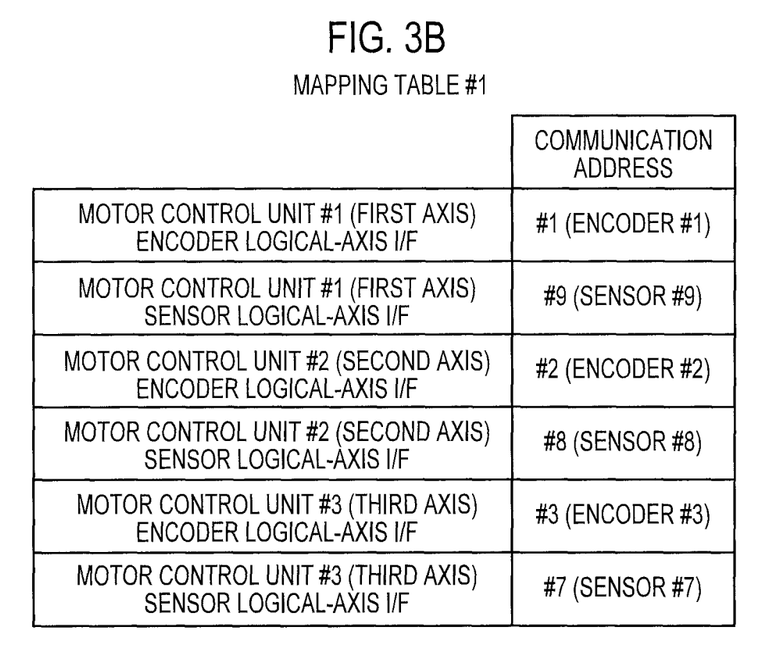

FIG. 3A illustrates an example of the mapping table managed by the encoder-sensor communication transmission-and-reception management unit 10 in the motor control apparatus #2 in the embodiment. FIG. 3B illustrates an example of the mapping table managed by the encoder-sensor communication transmission-and-reception management unit 10 in the motor control apparatus #1 in the embodiment.

The mapping table illustrated in FIG. 3A is set such that mapping between the encoder logical-axis interface 102 and the motor control apparatus #4, and the encoder #4 (communication address of the encoder #4) is performed, mapping between the encoder logical-axis interface 102 and the motor control apparatus #5, and the encoder #5 (communication address of the encoder #5) is performed, and mapping between the encoder logical-axis interface 102 and the motor control apparatus #6, and the encoder #6 (communication address of the encoder #6) is performed.

The mapping table illustrated in FIG. 3B is set such that mapping between the encoder logical-axis interface 102 and the motor control apparatus #1, and the encoder #1 (communication address of the encoder #1) is performed, mapping between the sensor logical-axis interface 103 and the motor control apparatus #1, and the sensor #9 (communication address of the sensor #9) is performed, mapping between the encoder logical-axis interface 102 and the motor control apparatus #2, and the encoder #2 (communication address of the encoder #2) is performed, mapping between the sensor logical-axis interface 103 and the motor control apparatus #2, and the sensor #8 (communication address of the sensor #8) is performed, mapping between the encoder logical-axis interface 102 and the motor control apparatus #3, and the encoder #3 (communication address of the encoder #3) is performed, and mapping between the sensor logical-axis interface 103 and the motor control apparatus #3, and the sensor #7 (communication address of the sensor #7) is performed.

The mapping tables may be set in advance by a user, and the setting details may be preserved in non-volatile memories (not illustrated) of the motor control apparatuses #1 and #2.

For example, the encoder-sensor communication transmission-and-reception management unit 10 is configured to assign unique communication addresses to the encoders #1 to #6 and the sensors #7 to #9 based on the above-described mapping tables in an communication initialization procedure.

The encoder-sensor communication transmission-and-reception management unit 10 is configured to transfer the constants of the motors #1 to #6, the identification information of the encoders #1 to #6, or the identification information of the sensors #7 to #9 to the corresponding encoder logical-axis interface 102 or the corresponding sensor logical-axis interface 103, based on the above-described mapping tables in the constant reading procedure.

Similarly, the encoder-sensor communication transmission-and-reception management unit 10 is configured to transfer the position information of the motors #1 to #6 or the sensor data of the sensors #7 to #9 to the corresponding encoder logical-axis interface 102 or the corresponding sensor logical-axis interface 103, based on the above-described mapping tables in the position-information reading procedure.

The transmission and reception units #1 and #2 are configured to perform processing of transmitting and receiving data to and from devices (motor control apparatus, encoder, sensor, and the like) other than the motor control apparatuses #1 and #2 to which the transmission and reception units #1 and #2 belong.

The repeater 20 is configured to perform transfer processing (repetition processing) of data between the transmission and reception unit #1 and the transmission and reception unit #2.

Here, in a connection state of the motor control apparatuses #1 and #2 illustrated in FIG. 1, the transmission and reception unit #1 in the motor control apparatus #2 is stopped, and the repeater 20 in the motor control apparatus #2 is in an OFF state. The encoders #1 to #6 are position detectors configured to detect position information of one motor of the plurality of motors #1 to #6 respectively corresponding to the encoders #1 to #6.

Here, the encoders #1 to #6 may be optical encoders or magnetic encoders, for example. The encoders #1 to #6 are configured to transmit the position information of the motors #1 to #6 to the motor control apparatuses #1 and #2.

In the embodiment, a case using the encoders #1 to #6 as the position detector is described as an example. The present disclosure can be applied to a case using a sensor (for example, resolver) capable of detecting the position information of the motors #1 to #6. Here, the encoders #1 to #6 may be linear scales (linear encoders) used in a case where the motors #1 to #6 are linear motors.

The motors #1 to #6 may be rotary motors or linear motors. Here, in a case where the motors #1 to #6 are rotary motors, the above-described position information indicates a rotation angle. In a case where the motors #1 to #6 are linear motors, the above-described position information indicates a linear position.

In the embodiment, a case where the six encoders #1 to #6 are provided is described as an example. The present disclosure can be applied to cases where five encoders or less are provided, or seven encoders or more are provided.

The mechanical apparatus is configured to be driven by the motors #1 to #6. For example, a robot corresponds to a mechanical apparatus 10A. For example, in the embodiment, each of the motors #1 to #6 is configured to drive each of the first axis to the sixth axis of a six-axis robot as the mechanical apparatus.

The sensors #7 to #9 are configured to detect information (sensor data) relating to at least any one of the motors #1 to #3 and the mechanical apparatus configured to be driven by the motors #1 to #3. For example, a temperature sensor, a pressure sensor, a torque sensor, a vibration sensor, a limit switch sensor, a touch sensor, and an I/O device are assumed as the plurality of sensors #7 to #9.

In the embodiment, a case where the three sensors #7 to #9 are provided is described as an example. The present disclosure can be applied to a case where any sensor is not provided, a case where one sensor is provided, a case where four sensors or more are provided, and the like.

Here, in the motor control system 1 according to the embodiment, as illustrated in FIG. 1, a case where the two motor control apparatuses #1 and #2 are connected to each other is described. The present disclosure can be applied to a case where three motor control apparatuses or more are connected in series.

In the motor control system 1 according to the embodiment, as illustrated in FIG. 1, all of the plurality of encoders #1 to #6 are connected in series under a control of the motor control apparatus #1 (first motor control apparatus).

Further, in the motor control system 1 according to the embodiment, as illustrated in FIG. 1, in a case where the sensors #7 to #9 are provided, all of the encoders #1 to #6 and all of the sensors #7 to #9 are configured to be connected in series under the control of the motor control apparatus #1.

In the embodiment, a case where the sensors #7 to #9 are connected in series under a control of the encoders #1 to #6 connected in series under the control of the motor control apparatus #1 is described as an example. The present disclosure is not limited to the case and can be applied to a case where a connection order of the encoders #1 to #6 and the sensors #7 to #9 is different from that in the above case.

Here, in the embodiment, the motor control apparatus #1 is configured to transfer the position information of the motors #1 to #6, which has been read out from the encoders #1 to #6, to the motor control apparatus #2 (other motor control apparatus) in the position-information reading procedure.

In the embodiment, the motor control apparatus #1 is configured to read at least one of the motor constants of the motors #1 to #3 and the encoder ID information of the encoders #1 to #3, from the encoders #1 to #3 respectively corresponding to the motors #1 to #3 controlled by the motor control apparatus #1.

Similarly, in the embodiment, the motor control apparatus #1 is configured to read out the identification information of the sensors #7 to #9 from the sensors #7 to #9 corresponding to the motors #1 to #3 controlled by the motor control apparatus #1.

In the embodiment, the motor control apparatus #2 is configured to read out at least any one of the motor constants of the motors #4 to #6 and the encoder ID information of the encoders #4 to #6, from the encoders #4 to #6 corresponding to the motors #4 to #6 controlled by the motor control apparatus #2, through the motor control apparatus #1.

In the embodiment, the motor control apparatus #2 (one of the other motor control apparatuses) is configured to operate as the master and read out the identification information (sensor ID information) of the sensors #7 to #9 from the sensors #7 to #9 through the motor control apparatus #1, in position-information reading procedure.

In the embodiment, the motor control apparatus #1 is configured to read out the sensor data of the sensors #7 to #9 from the sensors #7 to #9 corresponding to the motors #1 to #3 controlled by the motor control apparatus #1.

In a case where sensors corresponding to the motors #4 to #6 controlled by the motor control apparatus #2 are provided, the motor control apparatus #2 is configured to read out the sensor ID information of the sensor from this sensor through the motor control apparatus #1.

In the embodiment, a case where three axes of the six-axis robot are controlled by each of the two motor control apparatuses #1 and #2 is described as an example. The present disclosure can be applied to a case of controlling a one-axis robot by one motor control apparatus, a case of controlling two axes of a six-axis robot by each of three motor control apparatuses, a case of controlling three axes of a nine-axis robot by each of three motor control apparatuses, and the like.

Figure 4:
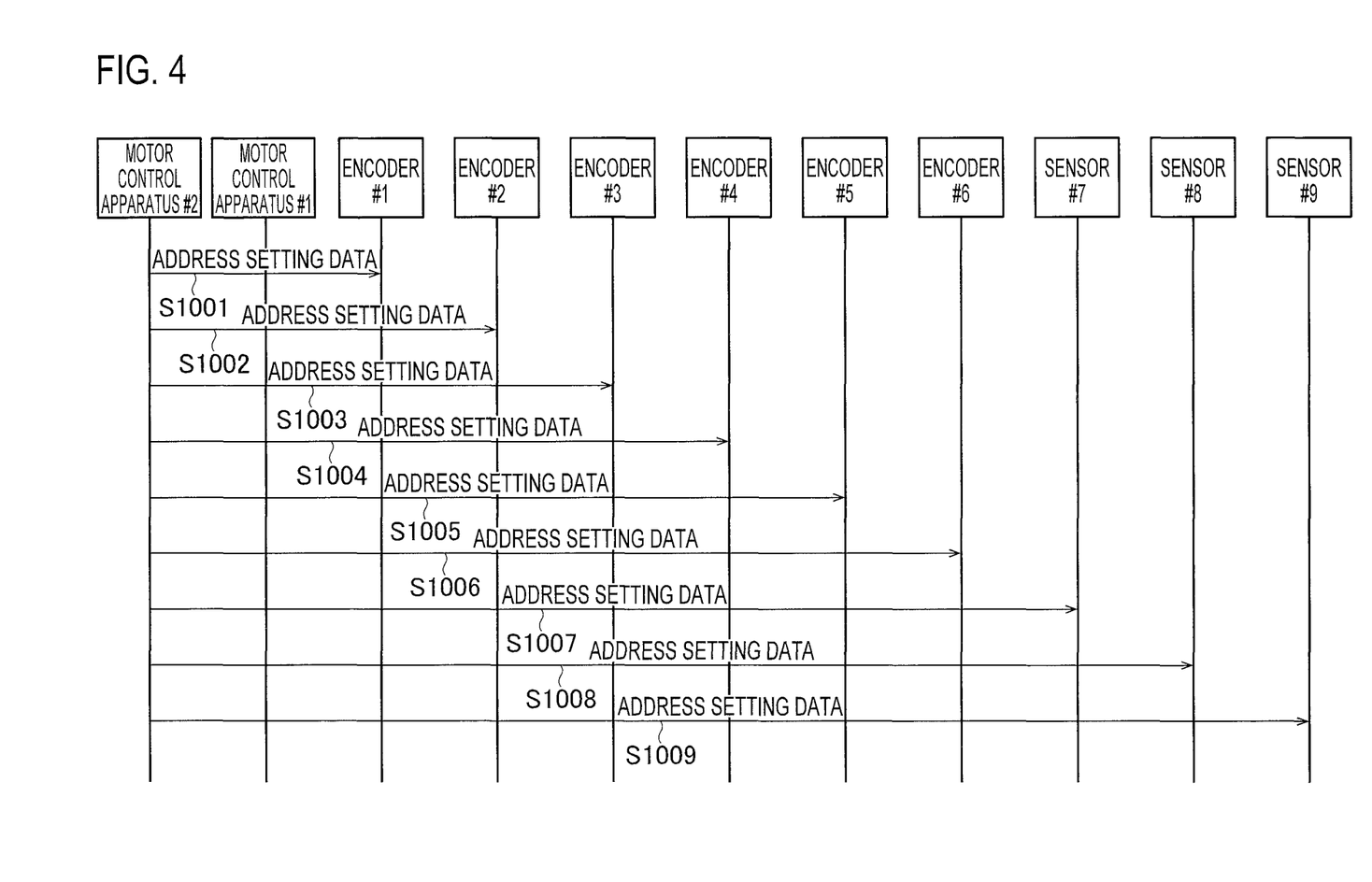
FIG. 4 is a diagram illustrating an example of a flow of processing performed in the motor control system according to the embodiment.
Figure 5:
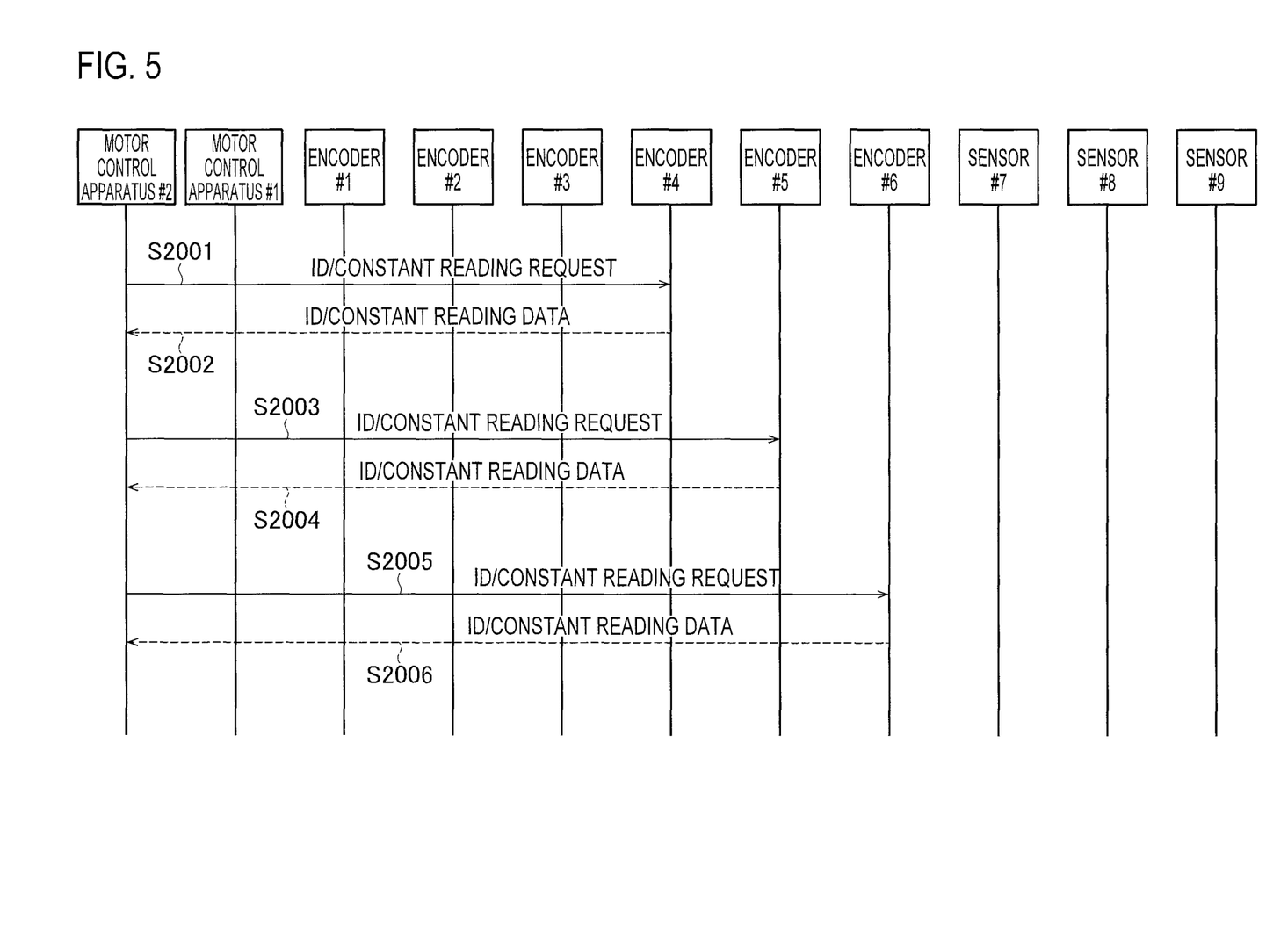
FIG. 5 is a diagram illustrating an example of a flow of processing performed in the motor control system according to the embodiment.
Figure 6:
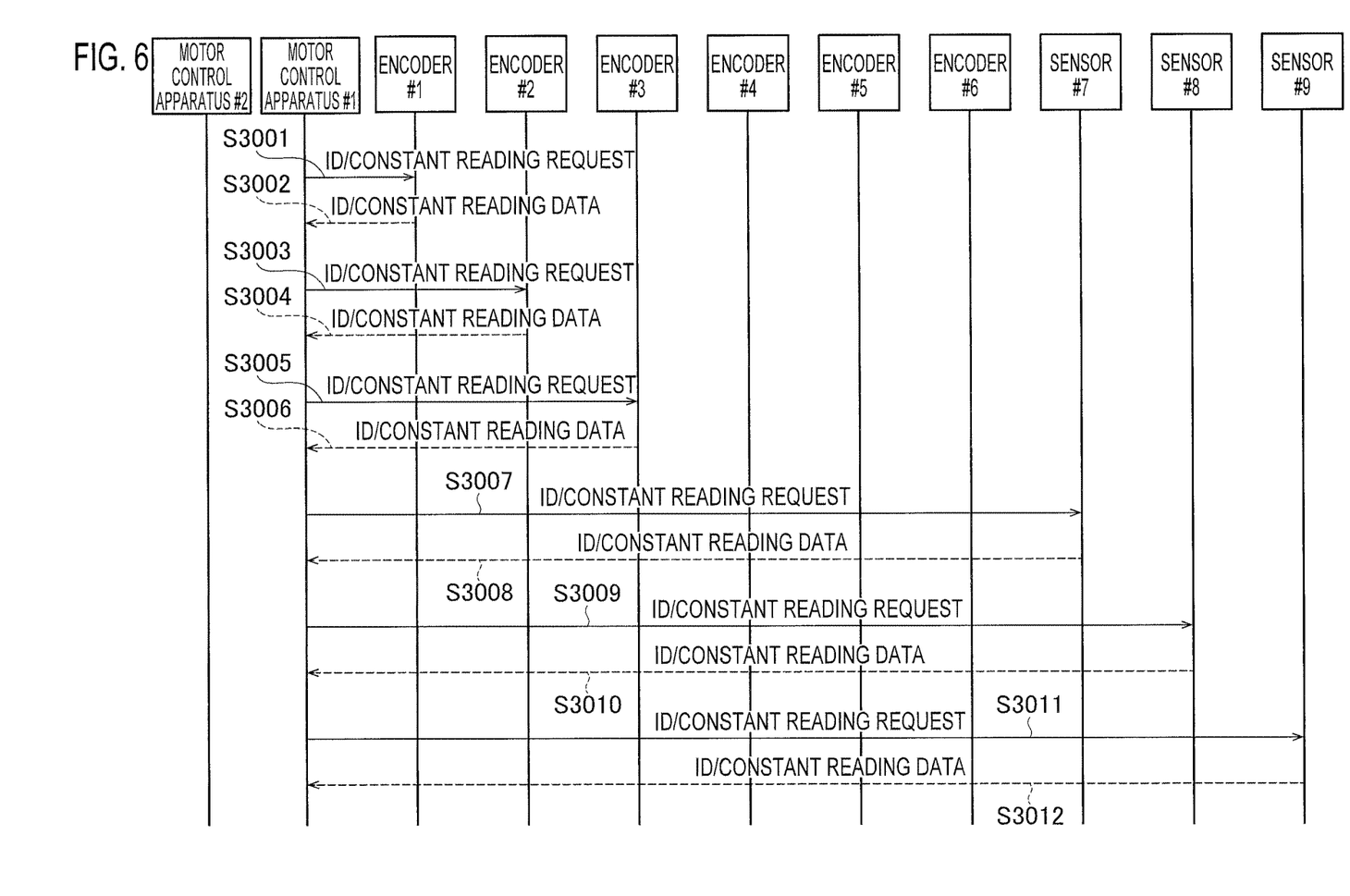
FIG. 6 is a diagram illustrating another example of the flow of the processing performed in the motor control system according to the embodiment.
Figure 7:
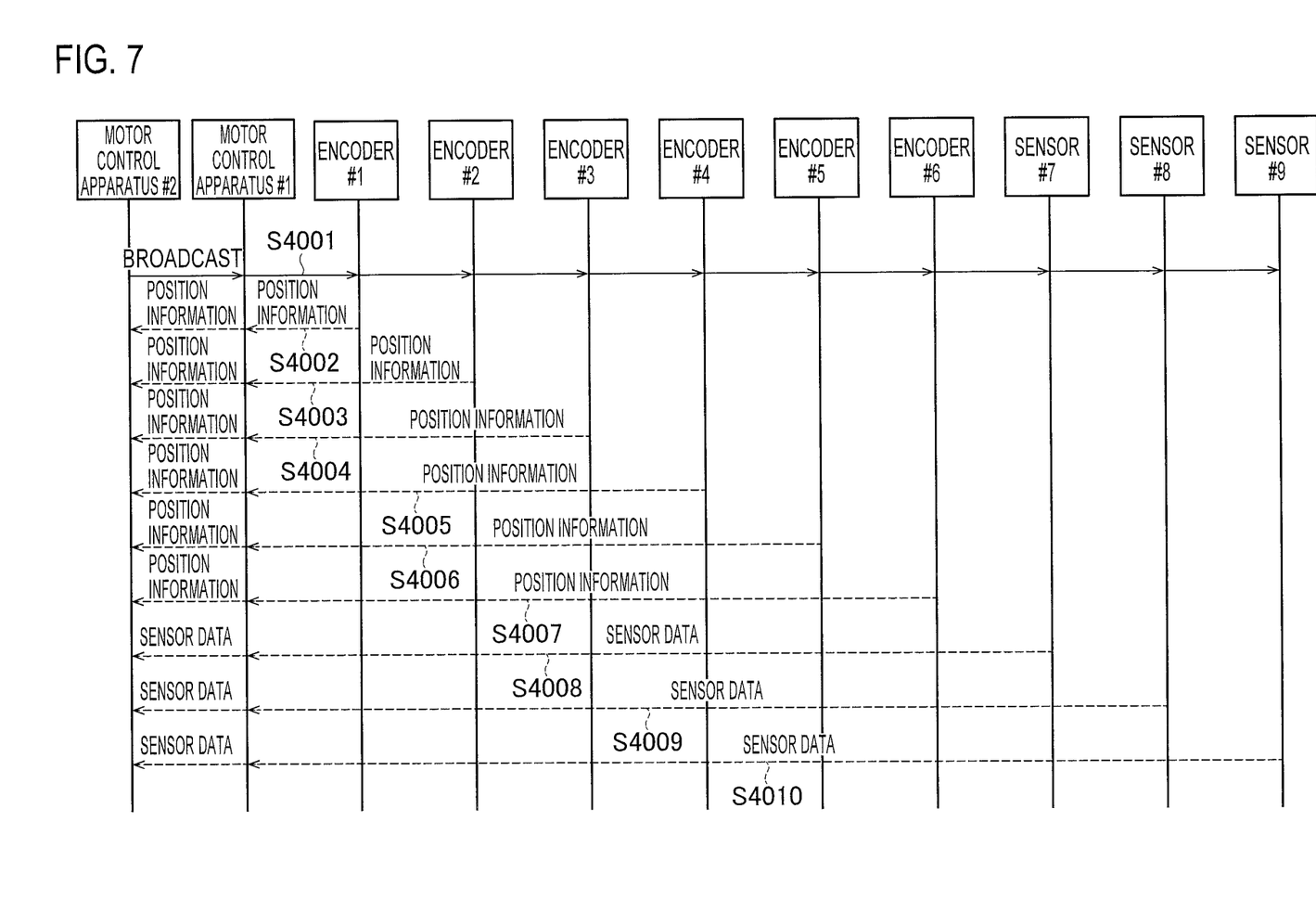
FIG. 7 is a diagram illustrating an example of a flow of processing performed in the motor control system according to the embodiment.

An example of a flow of processing performed in the motor control system 1 according to the embodiment will be described below with reference to FIGS. 4 to 7. FIG. 4 illustrates a flow of processing in a communication initialization procedure in the motor control system 1. FIGS. 5 and 6 illustrate a flow of processing in the constant reading procedure in the motor control system 1. FIG. 7 illustrates a flow of processing in the position-information reading procedure (normal mode) in the motor control system 1.

First, the communication initialization procedure in the motor control system 1 will be described with reference to FIG. 4. When the communication initialization procedure is started, the motor control apparatus #2 operates as the master, and the motor control apparatus #1 operates as a slave. The repeater 20 in the motor control apparatus #1 turns into an ON state.

As illustrated in FIG. 4, in Step S1001, the encoder-sensor communication transmission-and-reception management unit 10 in the motor control apparatus #2 assigns an unique communication address to the encoder #1 by transmitting address setting data to the encoder #1 through the transmission and reception unit #2 in the motor control apparatus #2, the transmission and reception unit #1 in the motor control apparatus #1, the repeater 20 in the motor control apparatus #1, and the transmission and reception unit #2 in the motor control apparatus #2.

In Step S1002, the encoder-sensor communication transmission-and-reception management unit 10 in the motor control apparatus #2 assigns an unique communication address to the encoder #2 by transmitting address setting data to the encoder #2 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, and the encoder #1.

In Step S1003, the encoder-sensor communication transmission-and-reception management unit 10 in the motor control apparatus #2 assigns an unique communication address to the encoder #3 by transmitting address setting data to the encoder #3 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, and the encoder #2.

In Step S1004, the encoder-sensor communication transmission-and-reception management unit 10 in the motor control apparatus #2 assigns an unique communication address to the encoder #4 by transmitting address setting data to the encoder #4 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, and the encoder #3.

In Step S1005, the encoder-sensor communication transmission-and-reception management unit 10 in the motor control apparatus #2 assigns an unique communication address to the encoder #5 by transmitting address setting data to the encoder #5 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, the encoder #3, and the encoder #4.

In Step S1006, the encoder-sensor communication transmission-and-reception management unit 10 in the motor control apparatus #2 assigns an unique communication address to the encoder #6 by transmitting address setting data to the encoder #6 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, the encoder #3, the encoder #4, and the encoder #5.

In Step S1007, the encoder-sensor communication transmission-and-reception management unit 10 in the motor control apparatus #2 assigns an unique communication address to the sensor #7 by transmitting address setting data to the sensor #7 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, the encoder #3, the encoder #4, the encoder #5, and the encoder #6.

In Step S1008, the encoder-sensor communication transmission-and-reception management unit 10 in the motor control apparatus #2 assigns an unique communication address to the sensor #8 by transmitting address setting data to the sensor #8 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, the encoder #3, the encoder #4, the encoder #5, the encoder #6, and the sensor #7.

In Step S1009, the encoder-sensor communication transmission-and-reception management unit 10 in the motor control apparatus #2 assigns an unique communication address to the sensor #9 by transmitting address setting data to the sensor #9 through the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #1, the encoder #2, the encoder #3, the encoder #4, the encoder #5, the encoder #6, the sensor #7, and the sensor #8.

Second, the constant reading procedure in the motor control system 1 will be described with reference to FIGS. 5 and 6. When the processing illustrated in FIG. 5 in the constant reading procedure is started, the motor control apparatus #2 operates as the master, and the motor control apparatus #1 operates as the slave. The repeater 20 in the motor control apparatus #1 turns into the ON state. When the processing illustrated in FIG. 6 in the constant reading procedure is started, both the motor control apparatuses #1 and #2 operate as the master, and thus both the repeater 20 in the motor control apparatus #1 and the repeater 20 in the motor control apparatus #2 turn into the OFF state.

As illustrated in FIG. 5, in Step S2001, the motor control unit #4 in the motor control apparatus #2 transmits an ID/constant reading request to the encoder #4 through the encoder-sensor communication transmission-and-reception management unit 10 in the motor control apparatus #2, the transmission and reception unit #2 in the motor control apparatus #2, the transmission and reception unit #1 in the motor control apparatus #1, the repeater 20 in the motor control apparatus #1, and the transmission and reception unit #2 in the motor control apparatus #2.

In Step S2002, the encoder #4 transmits ID/constant reading data (motor constant of the motor #4 or encoder ID information of the encoder #4) to the motor control unit #4 in the motor control apparatus #2 through the transmission and reception unit #2 in the motor control apparatus #2, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S2003, the motor control unit #5 in the motor control apparatus #2 transmits an ID/constant reading request to the encoder #5 through the encoder-sensor communication transmission-and-reception management unit 10 in the motor control apparatus #2, the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, and the encoder #4.

In Step S2004, the encoder #5 transmits ID/constant reading data (motor constant of the motor #5 or encoder ID information of the encoder #5) to the motor control unit #5 in the motor control apparatus #2 through the encoder #4, the transmission and reception unit #2 in the motor control apparatus #2, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S2005, the motor control unit #6 in the motor control apparatus #2 transmits an ID/constant reading request to the encoder #6 through the encoder-sensor communication transmission-and-reception management unit 10 in the motor control apparatus #2, the transmission and reception unit #2 in the motor control apparatus #2, the transmission and reception unit #1 in the motor control apparatus #1, the repeater 20 in the motor control apparatus #1, the transmission and reception unit #2 in the motor control apparatus #2, the encoder #4, and the encoder #5.

In Step S2006, the encoder #6 transmits ID/constant reading data (motor constant of the motor #6 or encoder ID information of the encoder #6) to the motor control unit #6 in the motor control apparatus #2 through the encoder #5, the encoder #4, the transmission and reception unit #2 in the motor control apparatus #2, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

As illustrated in FIG. 6, in Step S3001, the motor control unit #1 in the motor control apparatus #1 transmits an ID/constant reading request to the encoder #1 through the encoder-sensor communication transmission-and-reception management unit 10 in the motor control apparatus #1 and the transmission and reception unit #2 in the motor control apparatus #1.

In Step S3002, the encoder #1 transmits ID/constant reading data (motor constant of the motor #1 or encoder ID information of the encoder #1) to the motor control unit #1 in the motor control apparatus #1 through the transmission and reception unit #2 in the motor control apparatus #1 and the encoder-sensor communication transmission-and-reception management unit 10 in the motor control apparatus #1.

In Step S3003, the motor control unit #2 in the motor control apparatus #1 transmits an ID/constant reading request to the encoder #2 through the encoder-sensor communication transmission-and-reception management unit 10 in the motor control apparatus #1, the transmission and reception unit #2 in the motor control apparatus #1, and the encoder #1.

In Step S3004, the encoder #2 transmits ID/constant reading data (motor constant of the motor #2 or encoder ID information of the encoder #2) to the motor control unit #2 in the motor control apparatus #1 through the encoder #1, the transmission and reception unit #2 in the motor control apparatus #1, and the encoder-sensor communication transmission-and-reception management unit 10 in the motor control apparatus #1.

In Step S3005, the motor control unit #3 in the motor control apparatus #1 transmits an ID/constant reading request to the encoder #3 through the encoder-sensor communication transmission-and-reception management unit 10 in the motor control apparatus #1, the transmission and reception unit #2 in the motor control apparatus #1, the encoder #1, and the encoder #2.

In Step S3006, the encoder #3 transmits ID/constant reading data (motor constant of the motor #3 or encoder ID information of the encoder #3) to the motor control unit #3 in the motor control apparatus #1 through the encoder #2, the encoder #1, the transmission and reception unit #2 in the motor control apparatus #1, and the encoder-sensor communication transmission-and-reception management unit 10 in the motor control apparatus #1.

In Step S3007, the motor control unit #3 in the motor control apparatus #1 transmits an ID/constant reading request to the sensor #7 through the encoder-sensor communication transmission-and-reception management unit 10 in the motor control apparatus #1, the transmission and reception unit #2 in the motor control apparatus #1, the encoder #1, the encoder #2, the encoder #3, the encoder #4, the encoder #5, and the encoder #6.

In Step S3008, the sensor #7 transmits ID/constant reading data (sensor ID information of the sensor #7) to the motor control unit #3 in the motor control apparatus #1 through the encoder #6, the encoder #5, the encoder #4, the encoder #3, the encoder #2, the encoder #1, the transmission and reception unit #2 in the motor control apparatus #1, and the encoder-sensor communication transmission-and-reception management unit 10 in the motor control apparatus #1.

In Step S3009, the motor control unit #2 in the motor control apparatus #1 transmits an ID/constant reading request to the sensor #8 through the encoder-sensor communication transmission-and-reception management unit 10 in the motor control apparatus #1, the transmission and reception unit #2 in the motor control apparatus #1, the encoder #1, the encoder #2, the encoder #3, the encoder #4, the encoder #5, the encoder #6, and the sensor #7.

In Step S3010, the sensor #8 transmits ID/constant reading data (sensor ID information of the sensor #8) to the motor control unit #2 in the motor control apparatus #1 through the sensor #7, the encoder #6, the encoder #5, the encoder #4, the encoder #3, the encoder #2, the encoder #1, the transmission and reception unit #2 in the motor control apparatus #1, and the encoder-sensor communication transmission-and-reception management unit 10 in the motor control apparatus #1.

In Step S3011, the motor control unit #1 in the motor control apparatus #1 transmits an ID/constant reading request to the sensor #9 through the encoder-sensor communication transmission-and-reception management unit 10 in the motor control apparatus #1, the transmission and reception unit #2 in the motor control apparatus #1, the encoder #1, the encoder #2, the encoder #3, the encoder #4, the encoder #5, the encoder #6, the sensor #7, and the sensor #8.

In Step S3012, the sensor #9 transmits ID/constant reading data (sensor ID information of the sensor #9) to the motor control unit #1 in the motor control apparatus #1 through the sensor #8, the sensor #7, the encoder #6, the encoder #5, the encoder #4, the encoder #3, the encoder #2, the encoder #1, the transmission and reception unit #2 in the motor control apparatus #1, and the encoder-sensor communication transmission-and-reception management unit 10 in the motor control apparatus #1.

In a period in which the processing illustrated in FIG. 6 in the above-described constant reading procedure is performed, the motor control apparatus #1 operates as the master. Before the processing is started, the transmission and reception unit #1 in the motor control apparatus #1 is stopped, and the repeater 20 in the motor control apparatus #1 turns into the OFF state. The motor control apparatus #2 is in a state of waiting for receiving the position information of the motors #4 to #6, in this period (until the motor control apparatus #1 completes the entirety of the constant reading procedure).

Third, the position-information reading procedure (normal mode) in the motor control system 1 will be described with reference to FIG. 7. When the above-described constant reading procedure is completed, and the position-information reading procedure is started, the motor control apparatus #2 operates as the master. The motor control apparatus #1 turns into a monitoring mode in which only monitoring data transmitted from the motor control apparatus #2, the encoders #1 to #6, or the sensors #7 to #9 is possible. The repeater 20 in the motor control apparatus #1 turns into the ON state.

As illustrated in FIG. 7, in Step S4001, the encoder-sensor communication transmission-and-reception management unit 10 in the motor control apparatus #2 broadcasts a position information acquisition request to the encoders #1 to #6 and the sensors #7 to #9 through the transmission and reception unit #2 in the motor control apparatus #2, the transmission and reception unit #1 in the motor control apparatus #1, the repeater 20 in the motor control apparatus #1, and the transmission and reception unit #2 in the motor control apparatus #1.

In Step S4002, the encoder #1 transmits the position information of the motor #1 to the motor control unit #1 through the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

Here, since the monitored data is the position information of the encoder #1 corresponding to the motor #1 controlled by the motor control apparatus #1, the motor control apparatus #1 takes the position information of the encoder #1 with reference to the mapping table #1 (see FIG. 3B) managed by the encoder-sensor communication transmission-and-reception management unit 10 in the motor control apparatus #1.

In Step S4003, the encoder #2 transmits the position information of the motor #2 to the motor control unit #2 through the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

Here, since the monitored data is the position information of the encoder #2 corresponding to the motor #2 controlled by the motor control apparatus #1, the motor control apparatus #1 takes the position information of the encoder #2 with reference to the mapping table #1 (see FIG. 3B) managed by the encoder-sensor communication transmission-and-reception management unit 10 in the motor control apparatus #1.

In Step S4004, the encoder #3 transmits the position information of the motor #3 to the motor control unit #3 through the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

Here, since the monitored data is the position information of the encoder #3 corresponding to the motor #3 controlled by the motor control apparatus #1, the motor control apparatus #1 takes the position information of the encoder #3 with reference to the mapping table #1 (see FIG. 3B) managed by the encoder-sensor communication transmission-and-reception management unit 10 in the motor control apparatus #1.

In Step S4005, the encoder #4 transmits the position information of the motor #4 to the motor control unit #4 through the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S4006, the encoder #5 transmits the position information of the motor #5 to the motor control unit #5 through the encoder #4, the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S4007, the encoder #6 transmits the position information of the motor #6 to the motor control unit #6 through the encoder #5, the encoder #4, the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S4008, the sensor #7 transmits the sensor data of the sensor #7 to the motor control unit #3 through the encoder #6, the encoder #5, the encoder #4, the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S4009, the sensor #8 transmits the sensor data of the sensor #8 to the motor control unit #2 through the sensor #7, the encoder #6, the encoder #5, the encoder #4, the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

In Step S4010, the sensor #9 transmits the sensor data of the sensor #9 to the motor control unit #1 through the sensor #8, the sensor #7, the encoder #6, the encoder #5, the encoder #4, the encoder #3, the encoder #2, the encoder #1, the transmission and reception unit #2 in the motor control apparatus #1, the repeater 20 in the motor control apparatus #1, the transmission and reception unit #1 in the motor control apparatus #1, the transmission and reception unit #2 in the motor control apparatus #2, and the encoder-sensor communication transmission-and-reception management unit 10 in the motor control apparatus #2.

According to the motor control system 1 in the embodiment, even in a case where the plurality of encoders are connected in series under the control of the motor control unit #1 in the motor control apparatus 20, and the motor control unit #1 and the motor control unit #2 are connected to each other, it is possible to appropriately realize the setting procedure of the motor control apparatus 20. As a result, it is possible to reduce a physical or processing cost.

According to the motor control system 1 in the embodiment, the number of wires between the encoders #1 to #6 (and the mechanical apparatus that is driven by the motors #1 to #6), and the motor control apparatuses #1 and #2 installed in a control board is reduced. Thus, it is possible to realize processing load distribution of motor control processing #1 and #2.

REFERENCE SIGNS LIST 1 motor control system
10 encoder-sensor communication transmission-and-reception management unit
20 repeater
101 motor control calculation unit
102 encoder logical-axis interface
103 sensor logical-axis interface

The invention claimed is:
1. A motor control system configured to control a plurality of motors, the system comprising:
 a plurality of motor control apparatuses each of which is configured to control at least one of the plurality of motors;
 a plurality of position detectors each of which corresponds to each of the plurality of motors and each of which is configured to detect position information of each of the plurality of motors;
 all of the plurality of position detectors being connected in series under a control of a first motor control apparatus among the plurality of motor control apparatuses; and
 the first motor control apparatus being configured to transfer the position information of the plurality of motors read out from the plurality of position detectors to other motor control apparatuses among the plurality of motor control apparatuses, wherein the plurality of position detectors includes:
  at least one first position detector which detects position information of a first motor corresponding to the first motor control apparatus; and
  at least one second position detector which detects position information of an other motor corresponding to a second motor control apparatus included in the other motor control apparatuses,
one of the at least one first position detector is directly connected to the first motor control apparatus, and
the at least one second position detector is not directly connected to the first motor control apparatus and the second motor control apparatus, and the at least one second position detector is directly connected to at least another position detector of the plurality of position detectors.

2. The motor control system according to claim 1, wherein the first motor control apparatus is configured to read out from a first position detector at least one of a first motor constant of the first motor controlled by the first motor control apparatus or identification information of the first position detector corresponding to the first motor, and
each of the other motor control apparatuses is configured to read out from another position detector through the first motor control apparatus at least one of another motor constant of each of other motors controlled by each of the other motor control apparatuses or identification information of the other position detector corresponding to the other motor.

3. The motor control system according to claim 1, further comprising:
one or a plurality of sensors configured to detect information relating to at least one motor of the plurality of motors and a mechanical apparatus configured to be driven by the at least one motor, wherein
all of the plurality of position detectors and the one or all of the plurality of sensors are connected in series under the control of the first motor control apparatus, and
one of the other motor control apparatuses is configured to read out the information relating to at least one of the at least one motor and the mechanical apparatus configured to be driven by the at least one motor, from the one or the plurality of sensors through the first motor control apparatus.

4. The motor control system according to claim 3, wherein the first motor control apparatus is configured to read out identification information of the sensor corresponding to the first motor controlled by the first motor control apparatus, from the sensor.

5. The motor control system according to claim 3, wherein each of the other motor control apparatuses is configured to read out identification information of the sensor corresponding to the other motor controlled by each of the other motor control apparatuses, from the sensor through the first motor control apparatus.

6. A control method in a motor control system configured to control a plurality of motors, the method comprising:
controlling at least one of the plurality of motors by each of a plurality of motor control apparatuses;
detecting position information of one of the plurality of motors, which corresponding to each of a plurality of position detectors by each of the plurality of position detectors; and
transferring position information of the plurality of motors to other motor control apparatuses in the plurality of motor control apparatuses by a first motor control apparatus in the plurality of motor control apparatuses, the position information being read out from all of the plurality of position detectors, and all of the plurality of position detectors being connected in series under a control of the first motor control apparatus, wherein
the plurality of position detectors includes:
  at least one first position detector which detects position information of a first motor corresponding to the first motor control apparatus; and
  at least one second position detector which detects position information of an other motor corresponding to a second motor control apparatus included in the other motor control apparatuses,
one of the at least one first position detector is directly connected to the first motor control apparatus, and
the at least one second position detector is not directly connected to the first motor control apparatus and the second motor control apparatus, and the at least one second position detector is directly connected to at least another position detector of the plurality of position detectors.

7. A motor control apparatus used in a motor control system configured to control a plurality of motors, wherein
the motor control apparatus is configured to control at least one of the plurality of motors,
a plurality of position detectors configured to detect position information of one motor corresponding to each of the position detectors among the plurality of motors are connected in series under a control of the motor control apparatus,
the motor control apparatus is configured to transfer position information of the plurality of motors to other motor control apparatuses, the position information being read out from the plurality of position detectors,
the plurality of position detectors includes:
  at least one first position detector which detects position information of a first motor corresponding to the first motor control apparatus; and
  at least one second position detector which detects position information of an other motor corresponding to a second motor control apparatus included in the other motor control apparatuses,
one of the at least one first position detector is directly connected to the first motor control apparatus, and
the at least one second position detector is not directly connected to the first motor control apparatus and the second motor control apparatus, and the at least one second position detector is directly connected to at least another position detector of the plurality of position detectors.

* * * * *